United States Patent [19]
Tanoue et al.

[11] Patent Number: 5,884,117
[45] Date of Patent: Mar. 16, 1999

[54] IMAGE-FORMING APPARATUS WITH A COVER-MOUNTED DOCUMENT-READING UNIT AND A COMMON TRAY FOR RECEIVING A RECORDING MEDIUM AND ORIGINAL DOCUMENT FEATURES

[75] Inventors: Masahide Tanoue, Kashiwa; Hiroyuki Ishii; Hidehiko Kajiya, both of Abiko; Akira Yuza, Toride, all of Japan

[73] Assignee: Canon Kabushiki Kaisha, Tokyo, Japan

[21] Appl. No.: 884,620

[22] Filed: Jun. 27, 1997

[30] Foreign Application Priority Data

Jun. 28, 1996 [JP] Japan .................................. 8-169326

[51] Int. Cl.$^6$ ............................ G03G 15/00; H04N 1/04
[52] U.S. Cl. .............................. 399/1; 358/496; 358/498; 399/110; 399/377; 399/405
[58] Field of Search ..................................... 399/107, 108, 399/110, 111, 114, 1, 377, 405; 358/474, 496, 498

[56] References Cited

U.S. PATENT DOCUMENTS

| | | | |
|---|---|---|---|
| 5,267,058 | 11/1993 | Sata | 358/498 |
| 5,276,536 | 1/1994 | Hokamura | 358/498 |
| 5,579,129 | 11/1996 | Iwata et al. | 358/474 |
| 5,633,732 | 5/1997 | Ishizuka | 358/474 |

*Primary Examiner*—S. Lee
*Attorney, Agent, or Firm*—Fitzpatrick, Cella, Harper & Scinto

[57] ABSTRACT

An image forming apparatus features a document-reading unit mounted to an exterior cover of the apparatus to which at least part of an image-forming unit can be removed from the interior of the apparatus. The exterior cover can be operated without being disturbed by a document-reading unit. Accordingly, attaching and detaching at least part of the image-forming unit readily can be performed. Further, according to another aspect, an image forming apparatus features a common delivery tray, which can be used for both a recording paper and an original document. This saves space within the apparatus and therefore enables the image forming apparatus to be reduced in size. In addition, the recording paper and the original document are delivered to the tray with the image-printed or image-bearing surfaces thereon facing in different directions. Thus the user does not confuse the recording paper with the original document.

10 Claims, 8 Drawing Sheets

IMAGE-FORMING APPARATUS WITH A COVER-MOUNTED DOCUMENT-READING UNIT AND A COMMON TRAY FOR RECEIVING A RECORDING MEDIUM AND ORIGINAL DOCUMENT FEATURES

BACKGROUND OF THE INVENTION

1. Field of the Invention

The present invention relates to a multi-function image-forming apparatus integrally constructed by so-called image-forming means and document-reading means, such as a printer with a function of an image scanner or a printer with a function of a facsimile, and capable of performing multiple functions (for example, functions of a printer, a scanner, a facsimile, a copier or the like).

2. Description of Related Art

Figure 8:
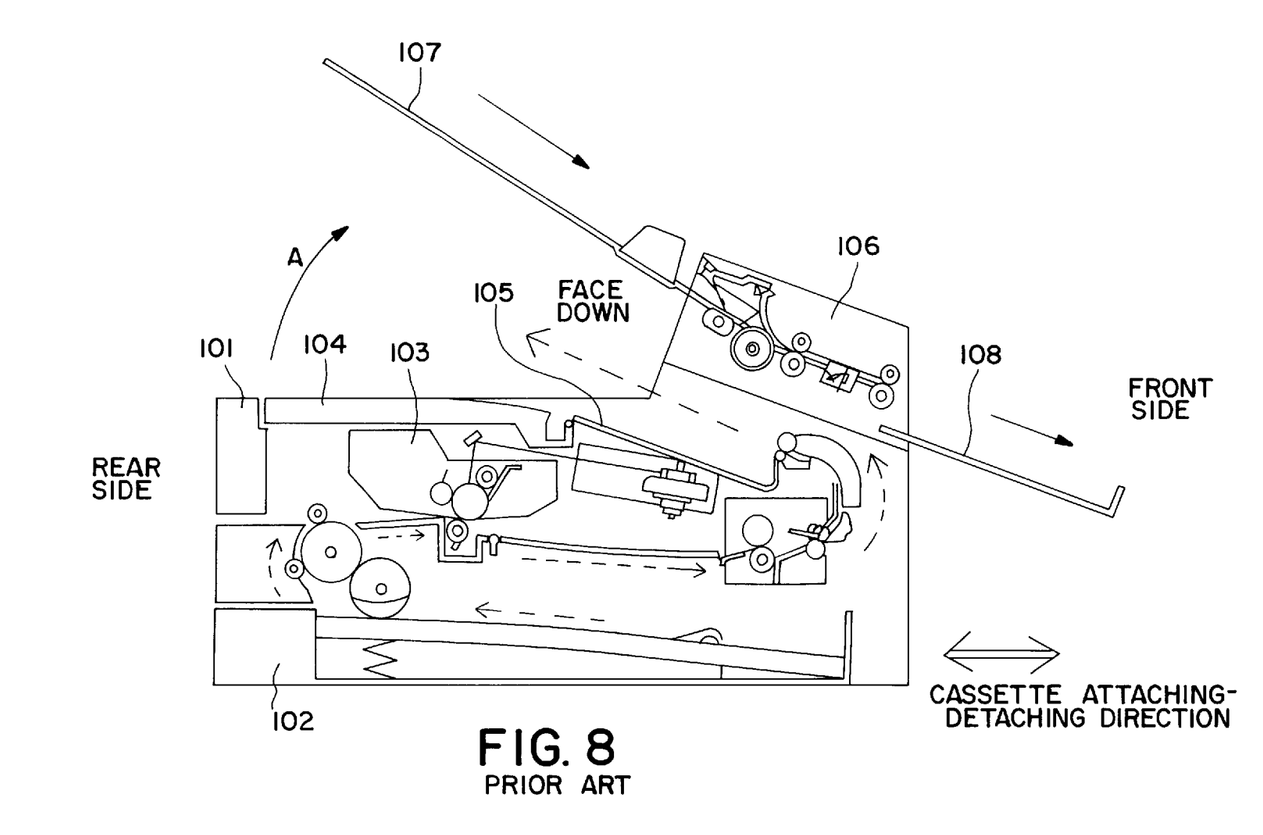
FIG. 8 is a longitudinal cross-sectional view of a conventional multi-function, image-forming apparatus.

A conventional apparatus of the afore-mentioned type has such a construction as shown in FIG. 8.

Referring to FIG. 8, there is shown an apparatus body 101 of a laser printer in which front and rear sides of the apparatus correspond to right and left sides of the figure, respectively. As is shown in FIG. 8, the apparatus body 101 of the laser printer comprises a sheet-feeding cassette 102 for receiving recording papers before subjected to image formation, a process cartridge 103 into which a photosensitive drum, a charging device, a developing device, a cleaner or the like are integrally incorporated, a cartridge cover 104 adapted to be opened or closed when the process cartridge 103 is mounted to or removed from the apparatus body 101, and a sheet-delivery tray 105 for receiving therein the recording papers on which a desired image has been formed.

When additional recording papers are supplied, the sheet-feeding cassette 102 is pulled out of the apparatus body 101 rightward (frontward) when viewed in FIG. 8.

Also, upon replacement of the process cartridge 103 and removal of jammed papers, a cartridge cover 104 is opened in the upward direction indicated by an arrow A in FIG. 8 to remove the process cartridge 103 from the apparatus body 101.

Further, the image scanner 106 which is adapted to read an image from an original document is mounted to an upper side of the apparatus body 101. The image scanner 106 is provided, on rear and front sides thereof, with a sheet-feeding tray 107 on which the original document is set, and a delivery tray 108 for receiving the original document from which the image has been read out, respectively. In FIG. 8, the advancing direction of the original document is indicated by a solid line arrow, while the advancing direction of the recording paper is indicated by a dotted line arrow.

However, the afore-mentioned conventional apparatus has posed the following problems. That is, when the cartridge cover 104 is opened to remove the process cartridge 103 from the apparatus body 101, there arises a problem that the sheet-feeding tray 107 hanging over the cartridge cover 104 inhibits the user's access thereto, which makes it difficult to remove the process cartridge 103.

Further, the printer with a function for reading out an image from the original document requires not only the sheet-feeding tray and the delivery tray for the recording paper but also those for the original document. As the size of the apparatus body is reduced, it becomes more important how these trays are arranged in the apparatus.

SUMMARY OF THE INVENTION

The present invention has been made to solve the afore-mentioned problems. Accordingly, it is an object of the present invention to provide an electrophotographic image-forming apparatus which is small in size and excellent in operability.

To accomplish the afore-mentioned object, in accordance with a representative constitution of the present invention, there is provided an electrophotographic image-forming apparatus which comprises a main assembly; an image-forming means for forming an image on a recording medium, which is mounted to an interior of the main assembly such that at least a part of the image-forming means can be removed therefrom; a cover for opening and closing the interior of the main assembly such that when the cover is opened, at least a part of the image-forming means is removable from the main assembly; and an original document-reading unit for reading an image from an original document, which is mounted to the cover so as to be moved together with the cover.

With the afore-mentioned construction, since the document-reading unit is mounted to the cover which is opened and closed so as to attach and detach at least a part of the image-forming means, the cover and the document-reading unit are prevented from interfering with each other. This allows smooth attaching and detaching operations of the part of the image-forming means.

Since the afore-mentioned document-reading unit is detachably mounted to the cover, the construction of the document-reading unit can be varied according to aimed applications, thereby permitting easy maintenance of the image-forming apparatus. In addition, since the delivery tray for receiving the recording paper on which desired image has been formed by the afore-mentioned image-forming means is integrally formed with the cover, the cover and the delivery tray can be prevented from interfering with each other. Further, since the document-reading unit is mounted to a front surface of the afore-mentioned image-forming apparatus, the user can have access to both the recording paper and the original document from the same front position. Especially, since the document-reading unit is arranged on a front side of the delivery tray, the original document can be readily recognized by the user, so that the user can be prevented from erroneously feeding the original document, e.g., setting sides or surfaces thereof upside down.

The afore-mentioned image-forming apparatus may further comprise a first sheet-feeding tray for receiving the recording medium to be supplied to the image-forming means, a delivery tray for receiving the recording medium on which desired image is formed by the image-forming means, and a second sheet-feeding tray for receiving the original document to be supplied to the document-reading unit, which trays hold the recording medium or the original document in the direction approximately perpendicular to a bottom surface of the apparatus.

With such a configuration in which the respective trays are arranged in an approximately upright position, the trays and the cover can be prevented from interfering with each other in the horizontal direction, which can permit the main assembly to be minimized.

The part of the afore-mentioned image-forming means which can be removed from the main assembly, may be at least one element selected from an electrophotographic photosensitive body, a charging device for electrifying the electrophotographic photosensitive body and a cleaner for cleaning the electrophotographic photosensitive body.

To accomplish the afore-mentioned object, in another aspect of the present invention, there is provided an image-forming apparatus having a function for reading out an image from an original document, which comprises an image-forming means for forming an image on a recording medium; a document-reading means for reading out the image from the original document; and a common delivery tray for receiving both the recording medium on which desired image has been formed by the image-forming means and the original document from which the image is read out by the document-reading means such that image-bearing surfaces of the recording medium and original document face in different directions from each other.

In the afore-mentioned construction, since the common delivery tray are provided for both the recording medium and the original document, it is possible to achieve saving of space therefor. In addition, since the recording medium and the original document is received in the common delivery tray such that the image-bearing surface of the recording medium faces in the reverse direction to that of the original document, the user can be prevented from confusing the recording medium with the original document and erroneously handling these materials.

In a further aspect of the present invention, there is provided an image-forming apparatus comprising a cover for opening and closing an interior of the main assembly such that when the cover is opened, at least a part of the afore-mentioned image-forming means can be removed from the main assembly, wherein the reading unit for the original document is fitted onto the cover so as to be movable together with the cover. With this construction, the movable cover and the respective trays requiring a large mounting space can be effectively arranged in the apparatus. In addition, since the common tray is integrally formed with a part of the cover, further saving of space can be achieved.

DETAILED DESCRIPTION OF THE EMBODIMENT

The preferred embodiments of the present invention will be described below with reference to the accompanying drawings.

[First Embodiment]

Figure 1:
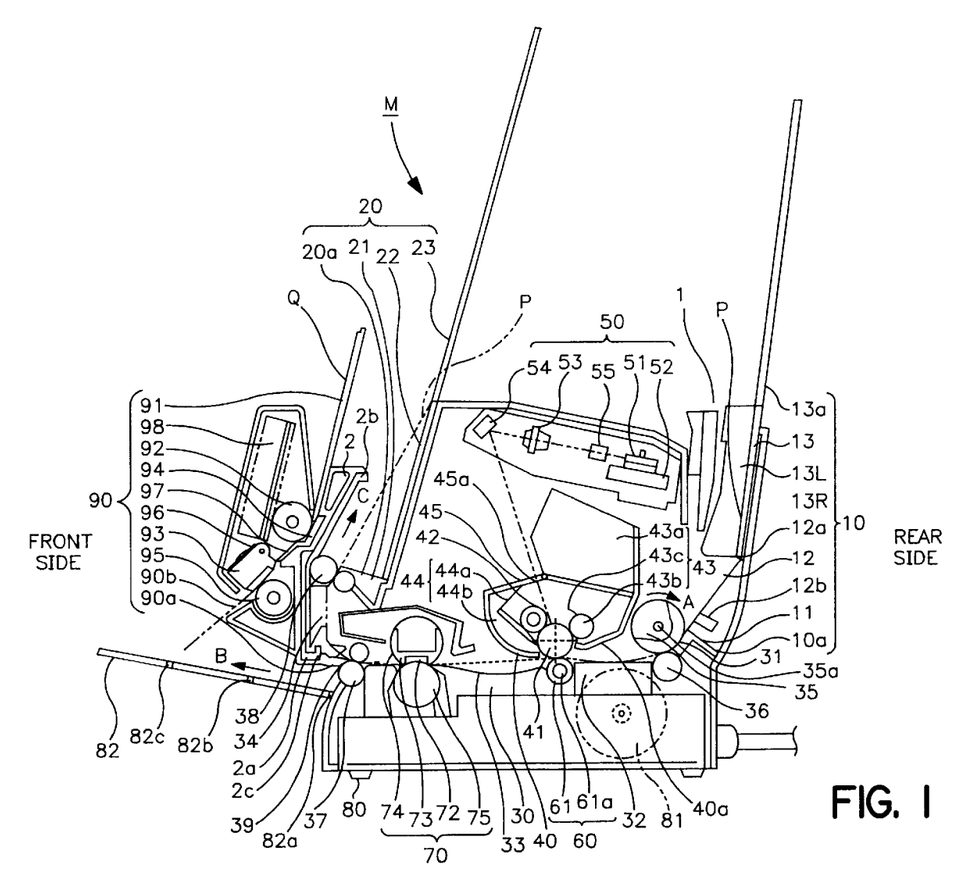
FIG. 1 is a longitudinal cross-sectional view of a multi-function, image-forming apparatus according to a first embodiment of the present invention.

Referring to FIG. 1, there is schematically shown a laser beam printer M equipped with a process cartridge as an example of an electrophotographic image-forming apparatus according to the present invention. Incidentally, the right and left sides of the printer illustrated throughout the accompanying drawings correspond to rear and front sides thereof, respectively. In addition, in the printer as shown in the figures, since a recording medium P is conveyed from the rear side to the front side, the rear and front sides of the printer correspond to upstream and downstream sides thereof, respectively, relative to the conveying direction of the recording medium P.

Meanwhile, as the recording medium P on which desired image is to be formed, there may be used special papers such as cartons or envelopes, or sheet materials other than papers, e.g., OHP films as well as ordinary plain papers. In the following embodiments, the ordinary plain papers (recording paper) are used as an example of the recording medium P.

First, a general construction of the laser beam printer M (hereinafter referred to merely as "printer M") is described below.

The printer M comprises a printer body 1 as an image-forming means (hereinafter referred to merely as "body"; incidentally, in the following descriptions, it is intended that the "body" involves not only a frame member constituting an exterior of the printer M but also a frame member constituting an interior thereof), and an image-reading unit 90 which is an image-reading means using a close-contact type contact image sensor as a read-out element. The body 1 is provided on a rear side thereof with a first supporting means 10 for supporting the recording paper P being before subjected to the image formation in an upright state, and on a front side thereof with a second supporting means 20 for also supporting the recording paper P after being subjected to the image formation in an upright state.

The lower end 10a of the first supporting means 10 is connected with the lower end 20a of the second supporting means 20 through a conveying path 30 extending from the rear side of the body 1 toward the front side thereof, so that U-shaped conveying path (hereinafter referred to merely as "vertical U-shaped path") is constructed as a whole.

The printer M further comprises a process cartridge 40 which is disposed immediately above the conveying path 30 and into which a drum-shaped electrophotographic photosensitive body 41 (hereinafter referred to merely as "photosensitive drum") or the like are integrally incorporated, an information light-irradiating means 50 disposed above the process cartridge 40, a transfer means 60 disposed underneath a mid-portion of the conveying path 30 in an opposed relation to the photosensitive drum 41, and a fixing means 70 disposed immediately below the lower end of the second supporting means 20 on the downward side of the conveying path 30. In relation to the afore-mentioned vertical U-shaped path, the process cartridge 40 and the information light-irradiating means 50 are arranged inside the vertical U-shaped path, while the transfer means 60 is arranged outside the vertical U-shaped path, Further, the fixing means 70 are so arranged as to extend across the vertical U-shaped path on the downstream side of the conveying path 30.

The operation of the above-constructed printer M will now be briefly described. First, the charging device 42, the information light-irradiating means 50 and the developing means 43 cooperate with each other to form a toner image on the photosensitive drum 41. The recording paper P is supplied in a face-down manner from the first supporting means 10 and transported through the upstream side of the conveying path 30 to the photosensitive drum 41 where the toner image formed thereon is transferred onto the recording paper P by the transfer means 60. The recording paper P having the transferred toner image thereon is sent to the fixing means 70 where the toner image is affixed on a surface thereof, and then delivered upwardly to the second supporting means 20 by which the recording paper P is supported in approximately an upright state.

In the thus-arranged or thus-operated printer M, namely, the printer M having the vertical U-shaped path, by reducing a length of the conveying path 30 in the fore-and-aft direction thereof, it is possible to minimize an area occupied by the body 1 irrespective of a length of the recording paper P in the conveying direction thereof.

Next, respective components of the afore-mentioned printer M is described in detail below.

The first supporting means 10 is provided on the rear side of the body 1 and comprises, sequentially from the bottom, an abutting member 11, a tip-supporting member 12 and a sheet-feeding tray 13. The abutting member 11 abuts against the forward tip end of the recording paper P from below to support the weight thereof. The tip-supporting member 12 is supported by the body 1 so as to be pivotable around a shaft 12a in the fore-and-aft direction, and biased toward the front side by a spring 12b disposed on a rear surface of a lower end portion thereof. The forwardly-biased tip-supporting member 12 is retained at a rearwardly retarded position by the action of a cam member (not shown) before feeding of the recording paper P, and moved only upon the feeding of the recording paper P by the rotation of the cam member to thereby urge the recording paper P rested thereon in the forward direction. The sheet-feeding tray 13 is so arranged as to project vertically upwardly from a rear end of an upper surface of the body 1. The sheet-feeding tray 13 supports intermediate and rear-end portions of the recording paper P from a rear surface side thereof such that the recording paper P before subjected to the image formation is supported as a whole in a flatly upright state. Two movable regulating plates 13L and 13R for regulating the position of the recording paper P in the left-to-right direction thereof (when viewed in the front-to-rear direction of the printer) is disposed on a front side of the sheet-feeding tray 13. In addition, the sheet-feeding tray 13 is provided on an upper end thereof with an extension guide 13a which can be upwardly pulled out of the sheet-feeding tray so as to stably support the recording paper P having a larger length in the conveying direction.

The second supporting means 20 is disposed on the front portion of the body 1 opposite to the first supporting means 10 provided on the rear portion of the body 1. The second supporting means 20 is mounted to the openable exterior cover 2 constituting a part of the body 1, and comprises, sequentially from the bottom, an abutting member (rear end-regulating surface) 21, a delivery tray (stacking surface) 22 and an extension tray 23. In the second supporting means 20, the recording paper P after subjected to the image formation is supported at its rear end from below by the abutting member 21. Further, the rear half portion of the recording paper P is supported from a back surface side thereof by the delivery tray 22 while the front half portion of the recording paper P is supported from a back surface side thereof by the extension tray 23. The extension tray 23 is liftably supported in the delivery tray 22 so as to be pulled out upwardly therefrom. The recording paper P after subjected to the image formation can be supported in a flatly upright state by the extension tray 23 pulled out and the delivery tray 22.

The conveying path 30 connects the lower end 10a of the first supporting means 10 with the lower end 20a of the second supporting means 20 and forms a passage extending from the rear side to the front side of the body 1 for conveying the recording paper P. The conveying path 30 comprises, sequentially from the rear side (upstream side) to the front side (downstream side), a separation pad 31, a pre-transfer guide 32, a post-transfer guide 33, and a reversing guide 34 disposed on a downstream side of the fixing means 70. Further, a feed roller 35 is disposed on an inclined upper side of the separation pad 31, and a conveying roller 36 is disposed below the feed roller 35.

The feed roller 35 has an outer circumferential surface which is formed eccentrically on a shaft 35a. When the feed roller 35 is rotated in the direction of an arrow A, the recording paper P is supplied from the first supporting means 10. The feed roller 35 cooperates with the conveying roller 36 to transport the recording paper P while preventing two or more recording papers P from being simultaneously fed in double sheet feeding manner between the feed roller 35 and the separation pad 31. The pre-transfer guide 32 extends in approximately horizontal direction and serves for guiding the recording paper P between an upper surface thereof and a lower surface 40a of the process cartridge 40 arranged thereabove and then introducing the recording paper P into a transfer section defined between the photosensitive drum 41 and a transfer roller 61 of the transfer means 60. The post-transfer guide 33 is formed into a moderate convex shape. After the toner image is transferred, the recording paper P is conveyed by the post-transfer guide 33 into a fixing section defined between a fixing film 74 of the fixing means 70 and a pressure roller 75. The reversing guide 34 is of a moderately curved shape and disposed between an F/U (face-up) delivery roller pair 37 located immediately downstream of the fixing means 70 and an F/D (face-down) delivery roller pair 38 located above the F/U roller pair 37 so as to upwardly guide the recording paper P on which the toner image has been fixed, toward the second supporting means 20. Incidentally, the reversing guide 34 is integrally formed with the afore-mentioned exterior cover 2.

The process cartridge 40 has such a construction that the photosensitive drum 41, a charging roller (charging means) 42, a developing device (developing means) 43 and a cleaning device (cleaning means) 44 are integrally incorporated into a cartridge casing 45, and is detachably mounted to the body 1.

The photosensitive drum 41 is constructed by a drum-shaped electrophotographic photosensitive body as described above, and driven by a driving mechanism including a motor 81 as a driving source which is mounted in the body 1.

The charging roller 42 is disposed so as to be brought into contact with a surface of the photosensitive drum 41, and rotatably driven in association with the rotation of the photosensitive drum 41. The charging roller 42 is applied with a charging voltage of superimposed D.C. and A.C. currents supplied from a board 80 mounted in the body 1. Therefore, the charging roller 41 can electrify a surface of the photosensitive drum 41 uniformly when the drum is rotated.

The developing device 43 comprises a toner receptacle 43a for storing a toner and a developing roller 43b. The developing roller 43b incorporates a magnet therein so that the toner is carried on a surface of the developer roller upon the rotation thereof. The thickness of the toner carried on the surface of the developer roller is regulated by a regulating blade 43c, upon which the toner is electrostatically charged.

The toner is attached onto an electrostatic latent image formed on the photosensitive drum 41 by an information light-irradiating means 50 described in detail hereinafter to form a toner image thereon. In the process cartridge 40 according to the present embodiment of the present invention, since the developer device 43 comprises the toner receptacle 43a disposed in an upper portion thereof and the developer roller 43b disposed in a lower portion thereof, the toner within the toner receptacle 43a is permitted to automatically fall by gravity on the developing roller 43b. Accordingly, it is not necessary to provide a special mechanism for transporting the toner within the toner receptacle 43a toward the developing roller 43b, for example, an agitating member or the like, whereby it is possible to simplify the construction of the process cartridge 40.

The cleaning device 44 comprises a cleaning blade 44a which is brought into slide contact with the surface of the photosensitive drum 41 whose toner image has been transferred to the recording medium, to remove a residual toner therefrom, and a cleaning container 44b into which the waste toner removed is recovered. The cartridge casing 45 is formed on an upper portion thereof with a hole 45a for permitting the photosensitive drum to be exposed to light passing therethrough. Incidentally, attaching and detaching operations of the process cartridge 40 to the body 1 are described hereinafter.

The information light-irradiating means 50 is adapted to irradiate light through the afore-mentioned hole 45a onto the surface of the photosensitive drum 41, and disposed as a whole above the process cartridge 40. The information light-irradiating means 50 comprises a semiconductor laser 55 for emitting a laser beam in response to a picture signal, a polygon mirror 51 which is rotated to reflect the laser beam, a motor 52 for rotatably driving the polygon mirror 51, a lens 53 and a reflecting mirror 54. When the laser beam is irradiated, the electrostatic latent image corresponding to the picture signal is formed on the surface of the photosensitive drum 41.

The afore-mentioned process cartridge 40 and information light-irradiating means 50 are compactly arranged within a space defined by the rear first supporting means 10, the front second supporting means 20 and the lower conveying path 30, i.e., the space located inside the vertical U-shaped path.

The transfer means 60 is disposed under the conveying path 30 and comprises a transfer roller 61 which is brought into contact with the photosensitive drum 41 from below and the transfer roller 61 cooperates with the photosensitive drum 41 to define a transfer section therebetween. The transfer roller 61 is supported at opposite right and left ends of a core metal 61 by spring-biased bearings. This allows the transfer roller to be pressed against the surface of the photosensitive drum 41 with a predetermined depressing force. The transfer voltage having a reverse polarity to that of the toner image is applied to the transfer roller 61 by the board 80. This permits the toner image on the photosensitive drum 41 to be transferred to the surface of the recording paper P passing through the transfer section.

The fixing means 70 comprises a ceramic heater 72 supported on the body 1 through a spring, a fixing film 74 mounted in the form of an endless belt around an outer circumferential surface of a guide 73, and a pressure roller 75 abutting against the fixing film 74 from below to thereby define a fixing section between the pressure roller 75 and the fixing film 74. The ceramic heater 72 and the fixing film 74 have a low heat capacity, and therefore can be heated to a temperature required for fixing, shortly after energizing thereof. This prevents unnecessary heat from being irradiated from the fixing means 70. The fixing means 70 is adapted such that when the recording paper P, onto which the toner image has been transferred in the transfer section located on the upstream side thereof, passes over the fixing section, the non-fixed toner image carried by the recording paper P is heat-fused and fixed on the surface of the recording paper P.

Figure 2:
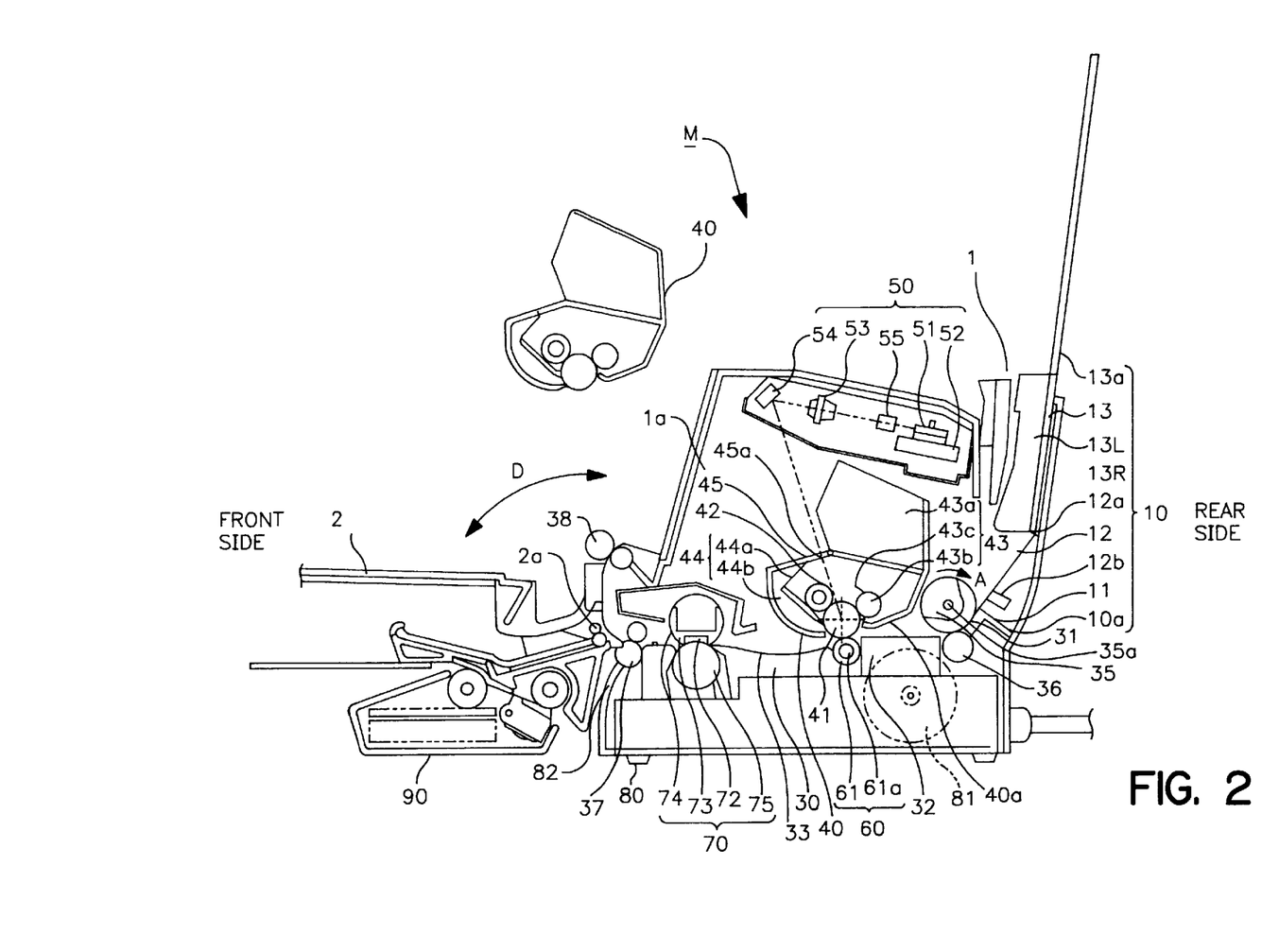
FIG. 2 is a view showing opening and closing operation of an exterior cover and attaching and detaching operations of a process cartridge according to the first embodiment of the present invention.

Next, the opening and closing operations of the exterior cover 2 of the body 1 and the attaching operation of the process cartridge 40 are described with reference to FIG. 2.

The exterior cover 2 has a combined function as a member for closing the front surface of the body 1 and as the afore-mentioned second supporting means 20, and is supported by a hinge 2a so as to be pivotable therearound in the direction of an arrow D. As shown in FIG. 2, when the exterior cover 2 is opened, a large access opening 1a is present on the front surface of the body 1 so that the process cartridge 40 is readily mounted to the interior of the body 1 therethrough.

Also, the process cartridge 40 mounted is readily removed from the body 1 in a similar manner. Further, when the process cartridge 40 is removed, the portion of the conveying path 30 ranging from the sheet-feeding section to the fixing section is exposed to outside, thereby facilitating removal of jammed recording papers P or the like.

Next, an entire image-forming operation of the above-constructed printer M is briefly described with reference to FIG. 1.

First, the recording papers P are set in an upright state in the first supporting means 10. While the photosensitive drum 41 in the process cartridge is rotatably driven, the surface of the photosensitive drum 41 is electrically charged to uniform potential having, for example, a negative polarity by the charging roller 42. The uniformly charged surface of the photosensitive drum 41 is then exposed to light irradiated from the information light-irradiating means 50. The information light-irradiating means 50 emits a laser beam in response to a picture signal to irradiate the surface of the photosensitive drum 41. The irradiated portion of the surface of the photosensitive drum 41 is caused to dissipate the negative charge thereon, thereby forming an electrostatic latent image on the surface of the photosensitive drum 41. The thus-formed electrostatic latent image is developed by the developing device 43 in such a manner that a toner having a negative polarity is attached to the latent image i.e., by so-called reversal development, thereby forming the toner image on the photosensitive drum 41.

On the other hand, the recording paper P which is kept in a stand-by state in the sheet-feeding section, is supplied to the transfer section by the feed roller 35 at the timing synchronous with the formation of the toner image. In the transfer section, the toner image on the photosensitive drum 41 is transferred to the recording paper P by the transfer roller 61 to which the transfer voltage having a positive polarity, which is the reverse to that of the toner, is applied. The recording paper P is transported to the fixing means where non-fixed toner image on the surface of the recording paper P is fixed by applying heat and pressure. After fixing, the recording paper P is then transported through the F/U delivery roller pair 37 to a flapper 39 constituting a guiding means. The flapper 39 guides the recording paper P along a straight path (direction of an arrow B) when urged upwardly (as indicated by a dotted line in FIG. 1), so that the recording paper P is delivered in a face-up manner to a face-up delivery tray 82 (Face-up (F/U) delivery).

In this case, the face-up delivery tray 82 constitutes a third supporting means, and can be folded at hinges 82a, 82b and 82c so as to be accommodated in the body 1. In the case where the afore-mentioned process cartridge 40 is attached to or detached from the body 1, the exterior cover 2 is opened or closed after the face-up delivery tray 82 is folded and accommodated in the body 1.

On the other hand, when the flapper 39 is urged downwardly (as illustrated by a solid line in FIG. 1), the recording paper P is guided upwardly and delivered in the direction of an arrow C through the reversing guide 34 and the F/D delivery roller pair 38 with the image-bearing surface thereof facing downwardly (face-down (F/D) delivery). The F/D delivery permits the recording paper P to be delivered to the delivery tray 22 of the second supporting means 20.

Figure 3:
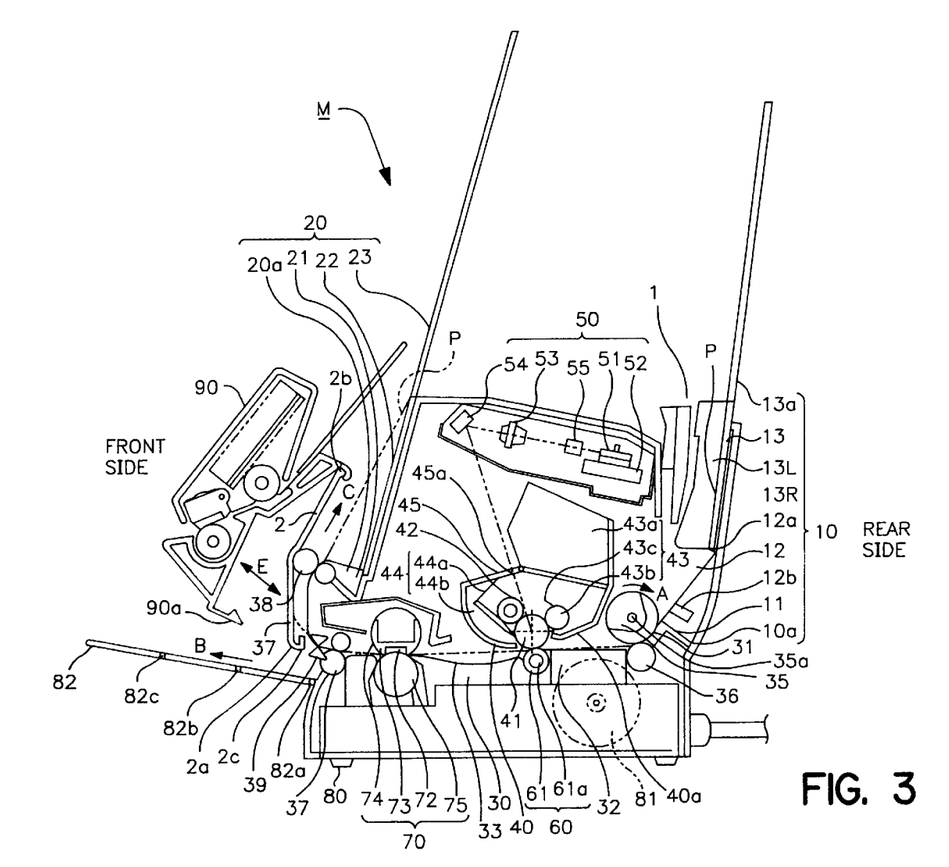
FIG. 3 is a view showing attaching and detaching operations of an image-reading unit according to the first embodiment of the present invention.

Next, the construction of the image-reading unit 90 is explained with reference to FIGS. 1 and 3. The image-reading unit 90 (the "image-reading unit" described hereinafter is intended to involve a frame member constituting an entire body thereof) is mounted onto the front surface of the exterior cover 2 of the body 1 and constructed so as to be rotatable around a shaft 2b in the direction of an arrow E. The image-reading unit 90 is detachably mounted to the exterior cover 2 by engaging claws 90a provided on a lower portion thereof with claw-receiving portions 2c formed in the exterior cover 2.

The image-reading unit 90 comprises, sequentially from the top in the vertical direction, a document-feeding tray 91 on which an original document Q is set, a feed roller 92 for supplying the original document Q and a contact image sensor 93 for reading an image information from the original document Q. These components are arranged in an approximately linear manner. The document-feeding tray 91 is constructed in a retractable manner so as to be accommodated within the image-reading unit 90 when not used. A separation pad 94 is disposed on an inclined lower side of the feed roller 92, and a reading roller 95 is disposed below the contact image sensor 93 in opposite relation to each other. The contact image sensor 93 is urged toward the reading roller 95 by means of a spring 96 so as to be brought into pressure contact with the reading roller 95. Further, a conveying guide 97 is arranged between the feed roller 92 and the contact image sensor 93.

Incidentally, the feed roller 92 and the reading roller 95 are driven by a drive mechanism mounted in the image-reading unit 90 and including a motor (not shown) as a driving source. The picture signal read out by the contact image sensor 93 is processed in a board 98 mounted within the image-reading unit 90, and sent to the body 1 through a connector (not shown) coupled with the body 1. The connector is of a floating type and adapted to conduct ON/OFF control of the electrical connection between the image-reading unit 90 and the body 1 in response to attaching or detaching operations of the image-reading unit 90.

Next, the operation of the above-constructed image-reading unit 90 is explained below. First, the original document Q is set (in face-up manner) on the document-feeding tray 91 such that a surface of the original document Q on which an image information to be read is present, faces upwardly. Successively, when a signal indicative of initiation of image-reading is input to the board 98, the feed roller 92 begins to rotate and feeds the original document Q to the downstream side thereof by the cooperation with the separation pad 94 while preventing two or more documents from being fed simultaneously. The fed original document Q is then guided through the conveying guide 97 to a nip portion between the contact image sensor 93 and the reading roller 95. The image-bearing surface of the thus-guided original document Q is pressed against the contact image sensor 93 by the reading roller 95 while being conveyed therethrough. The original document Q is then conveyed through an delivery port 90b, and delivered onto the face-up delivery tray 82 with the image-bearing surface thereof facing upward. At this time, the picture signal read out by the contact image sensor 93 is sent to the body 1 through the board 98 to output a printed image. Further, the picture signal is sent to a computer through the body 1 to conduct image-processing, and thereafter the processed image is fed back to the body 1 for printing.

With the afore-mentioned arrangement, the user can perform, from the front side of the body 1, all the operations including the setting of the recording paper P on the document-feeding tray 13, the setting of the original document Q on the document-feeding tray 91 of the image-reading unit 90, the removal of the recording paper P delivered onto the delivery tray 22 and the removal of the recording paper P and the original document Q delivered onto the face-up delivery tray 82. In addition, the removal of the process cartridge 40 can be readily performed from the front side of the body 1 by opening the exterior cover 2 provided on the front side of the body 1 without necessity of removing the image-reading unit 90. Also, the attachment or detachment of the image-reading unit 90 relative to the body 1 can be readily performed from the front side of the body 1.

As described above, in the case where the body 1 is used in combination with the image-reading unit 90, all the operations required upon setting, sheet-feeding, sheet-delivery and trouble-shooting for jammed papers or the like can be performed from the same direction similarly to the case where the body 1 is used singly, thereby imparting extremely excellent operability to the apparatus. Further, since the image-reading unit 90 has an approximately linear conveying path, the surface of the original document Q can be prevented from being damaged. Furthermore, since the image-reading unit 90 is disposed above the face-up delivery tray 82, the increase in actual installation area therefor can be avoided.

[Second Embodiment]

In addition to the afore-mentioned first embodiment, various other modifications or changes can be made without departing from the scope of the present invention. Next, the second preferred embodiment of the present invention is described with reference to FIG. 4. In the above-described first embodiment, the document-feeding tray 91 on which the original document Q is set is constructed so as to be retractable into the image-reading unit 90. On the other hand, in the second embodiment, the front half portion of the original document Q is supported on a part 90c of the image-reading unit 90, while the rear half portion of the original document Q is supported on the delivery tray 22 or the extension tray 23.

Figure 4:
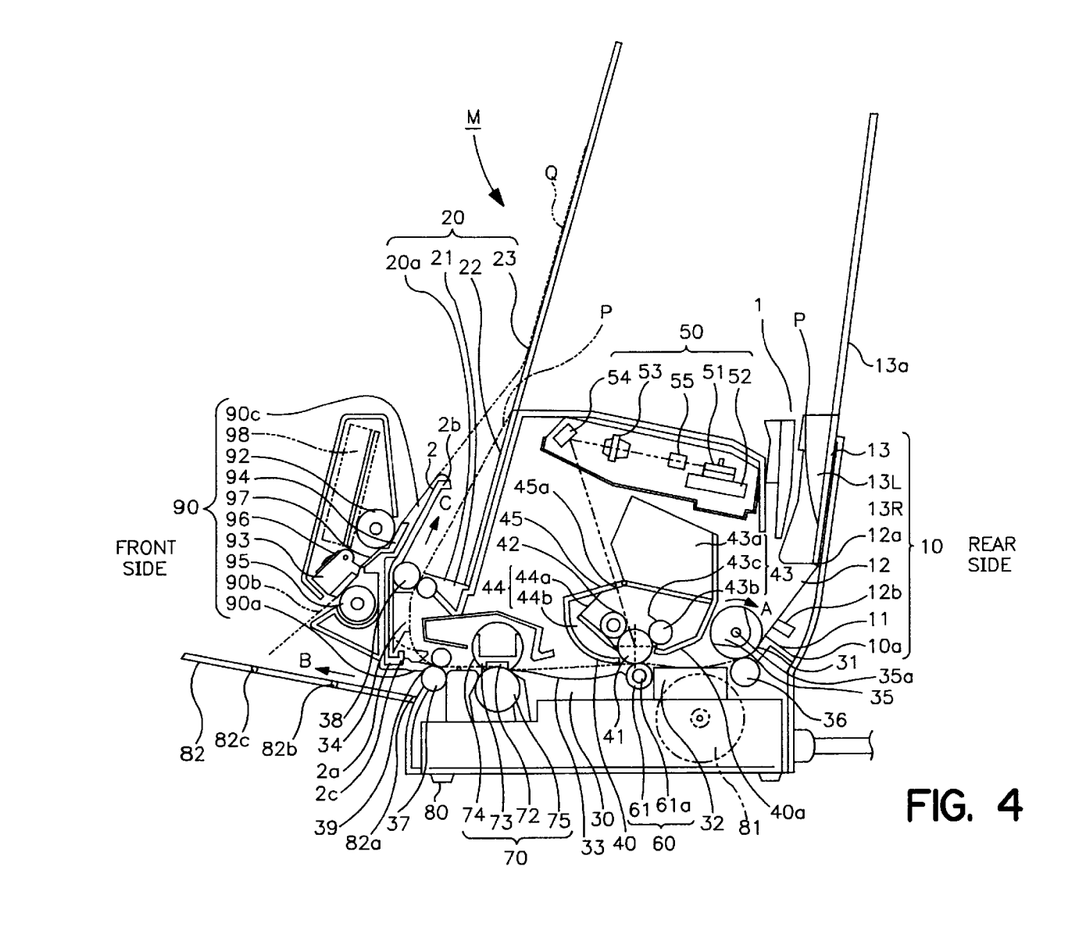
FIG. 4 is a longitudinal cross-sectional view of a multi-function, image-forming apparatus according to a second embodiment of the present invention.

Accordingly, when the original document Q is set, the document-feeding tray 91 is not required to be pulled out of the image-reading unit, so that further improvement in operability can be achieved. In addition, since the document-feeding tray 91 for the original document Q can be omitted, no tray is required for feeding and delivering the original document Q, thereby achieving compact size of the image-reading unit 90 itself, reduction in weight and decrease in production cost.

[Third Embodiment]

Figure 5:
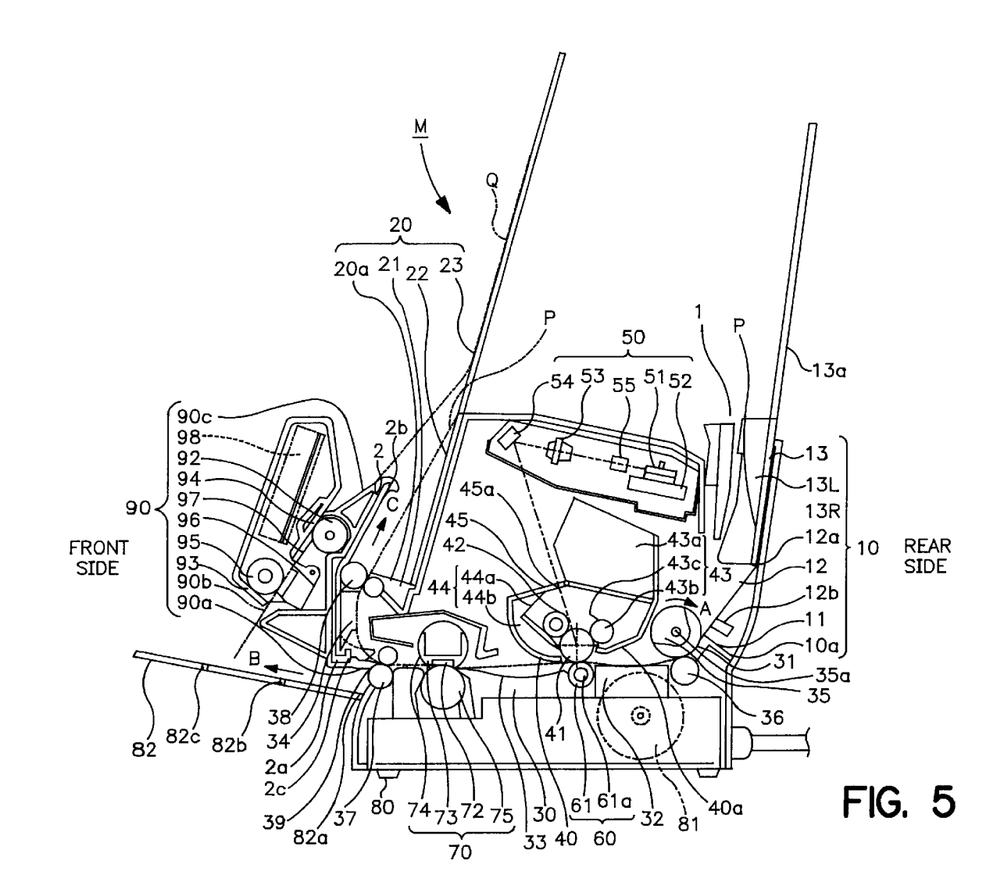
FIG. 5 is a longitudinal cross-sectional view of a multi-function, image-forming apparatus according to a third embodiment of the present invention.

Further, the third embodiment of the present invention is explained with reference to FIG. 5. The image-reading unit 90 according to the third embodiment comprises, sequentially from the top in the vertical direction, a portion 90c of the image-reading unit 90 on which the original document Q is set, a feed roller 92 for supplying the original document Q and the contact image sensor 93 as an image-reading means. These components are also arranged in an approximately linear manner, similarly to those of the second embodiment. The separation pad 94 is disposed on an inclined upper side of the feed roller 92, and the reading roller 95 is disposed above the contact image sensor 93 in an opposite relation to each other. Incidentally, the contact image sensor 93 is urged toward the reading roller 95 by means of the spring 96 so as to be brought into pressure contact therewith. In addition, the conveying guide 97 is disposed between the feed roller 92 and the contact image sensor 93.

In the afore-mentioned arrangement, the original document Q is set (face-down) on the portion 90c of the image-reading unit 90 with a surface thereof on which an image to be read is present facing downward. Successively, when a signal indicative of initiation of image-reading is input to the board 98, the feed roller 92 begins to rotate and supplies the original document Q to the downstream side thereof by the cooperation with the separation pad 94 while preventing two or more original documents Q from being fed simultaneously. The fed original document Q is guided through the conveying guide 97 to the nip portion between the contact image sensor 93 and the reading roller 95. While the original document Q is further conveyed, the image-bearing surface of the original document Q is pressed against the contact image sensor 93 by the reading roller. The original document Q is then delivered through the delivery port 90b onto the face-up delivery tray 82 with the image-bearing surface facing downward.

Accordingly, the recording paper P is delivered on the face-up delivery tray 82 with the image-printed surface thereof facing upward, while the original document Q is delivered on the same face-up delivery tray 82 with the image-bearing surface thereof facing downward. Thus, the user does not confuse the recording paper P with the original document Q, and therefore can clearly distinguish them from each other.

[Fourth Embodiment]

Figure 6:
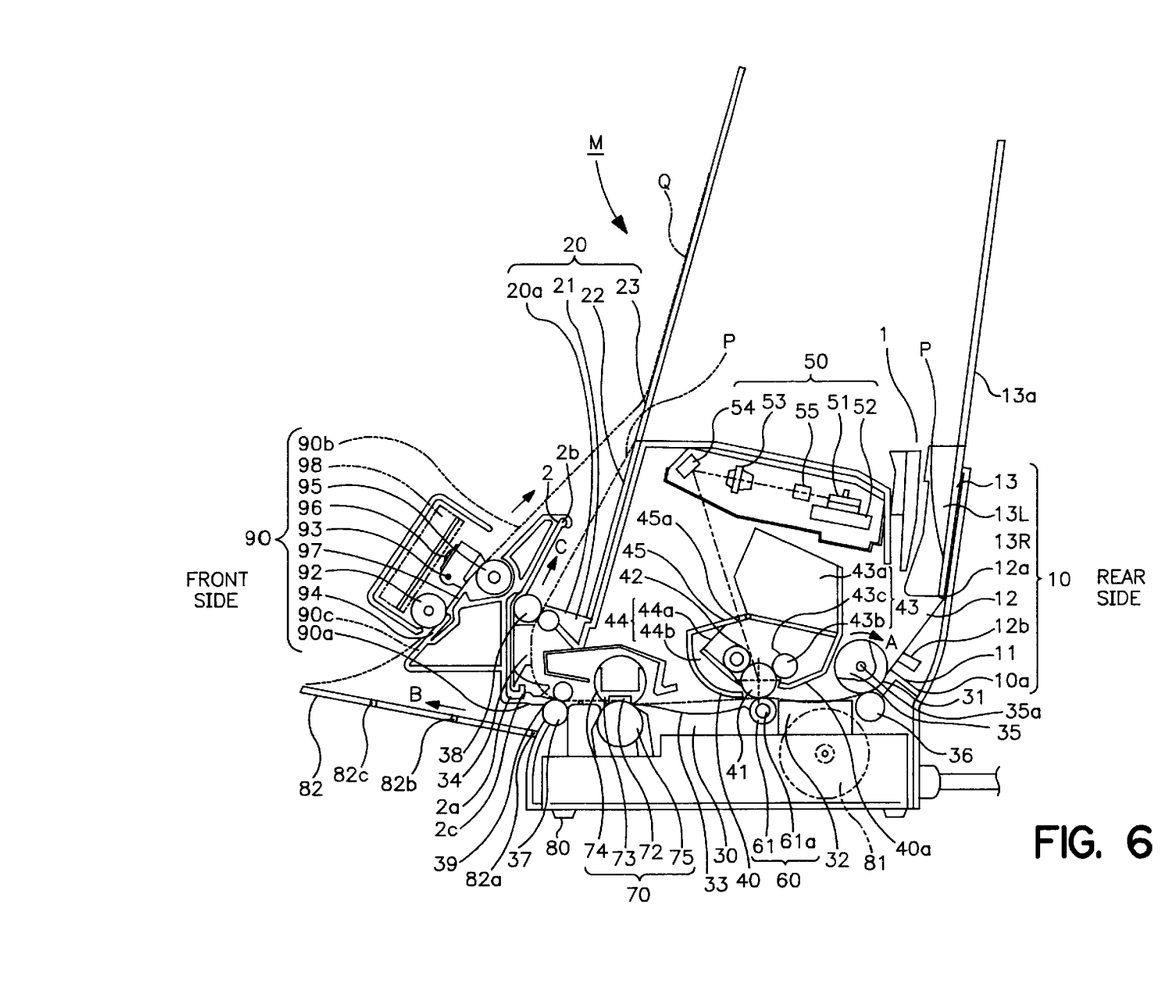
FIG. 6 is a longitudinal cross-sectional view of a multi-function, image-forming apparatus according to a fourth embodiment of the present invention.

Further, the fourth embodiment of the present invention is described with reference to FIG. 6. In this embodiment, the image-reading unit 90 comprises, sequentially from the bottom in the vertical direction, the portion 90c of the image-reading unit 90 on which the original document Q is set, the feed roller 92 for supplying the original document Q and the contact image sensor 93 as an image-reading means. These components are arranged in an approximately linear manner. The separation pad 94 is disposed on an inclined lower side of the feed roller 92, and the reading roller 95 is disposed below the contact image sensor 93 in an opposite relation to each other. The contact image sensor 93 is urged toward the reading roller 95 by means of the spring 96 so as to be brought into pressure contact therewith. In addition, the conveying guide 97 is disposed between the feed roller 92 and the contact image sensor 93. That is, in the thus-arranged image-reading unit 90, when the original document Q is set (face-up setting) on the portion 90c of the image-reading unit 90 with a surface thereof on which an image to be read is present facing upward, the feed roller 92 begins to rotate in response to the signal indicative of initiation of image-reading which is input to the board 98, and supplies the original document Q in the upward direction by the cooperation with the separation pad 94 while preventing two or more original documents Q from being fed simultaneously. The fed original document Q is guided through the conveying guide 97 to the nip portion between the contact image sensor 93 and the reading roller 95. The original document Q is further guided while the image-bearing surface thereof is pressed against the contact image sensor 93 by the reading roller, and delivered through a delivery port 90b onto the delivery tray 22 or the extension tray 23 with the image-bearing surface in face-up (F/U) status.

Accordingly, even while the recording paper P is delivered in the face-down manner in the body 1, the user can set the original document Q in the image-reading unit 90 without being disturbed by delivery of the recording papers P. Therefore, according to the present embodiment, the document-feeding tray for supplying the original document Q can be omitted from the arrangement described in the afore-mentioned first embodiment which exhibits similar operability. As a result, the arrangement of this embodiment can satisfy requirements of compact size, reduced weight and low production cost of the image-reading unit 90 simultaneously. Further, while the recording paper P is delivered onto the delivery tray 22 with the image-printed surface thereof facing downward, the original document Q is delivered onto the same delivery tray 22 with the image-bearing surface thereof facing upward. Accordingly, the user does not confuse the recording paper P with the original document Q, and therefore can clearly distinguish them from each other.

[Fifth Embodiment]

Figure 7:
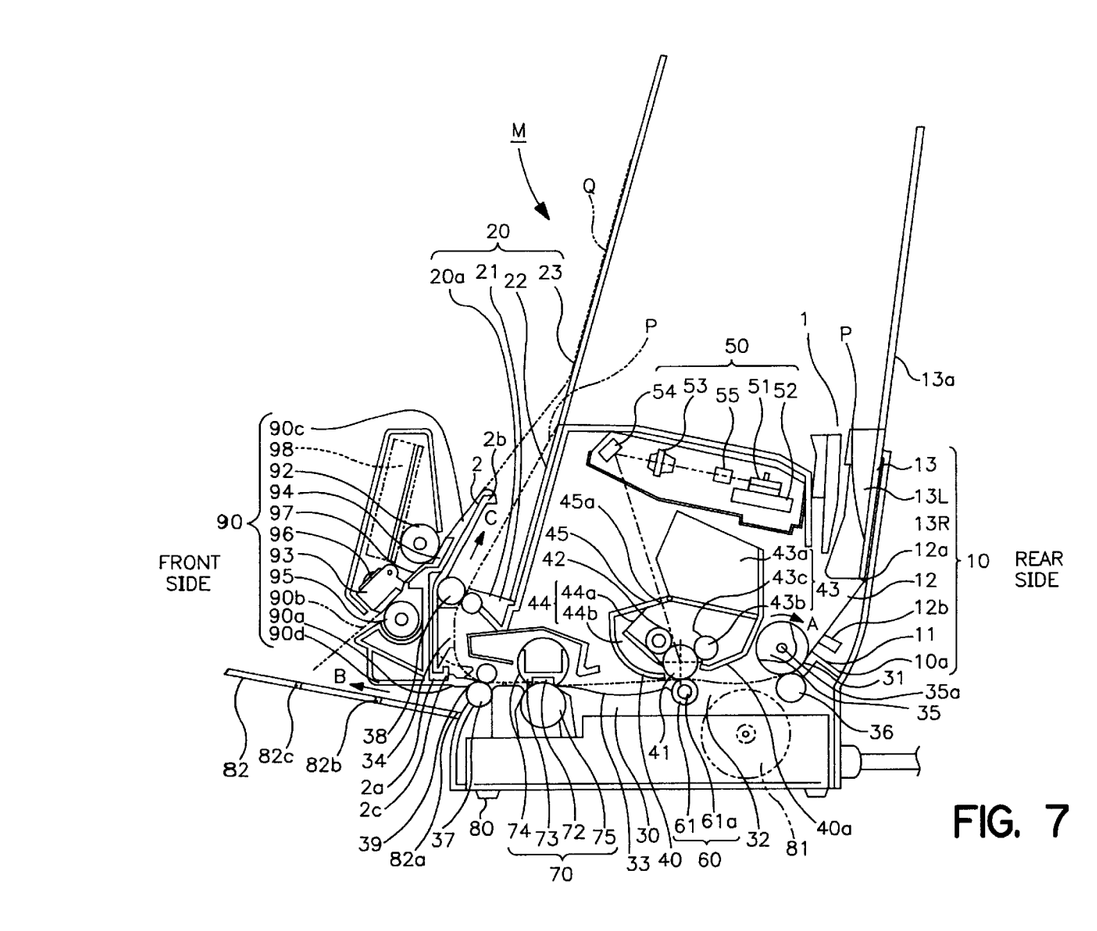
FIG. 7 is a longitudinal cross-sectional view of a multi-function, image-forming apparatus according to a fifth embodiment of the present invention.

Further, the fifth embodiment of the present invention is described with reference to FIG. 7. In this embodiment, the image-reading unit 90 is formed with a lower horizontal surface 90d, and therefore can be self-standing on a horizontal plane by itself. Accordingly, when the image-reading unit 90 which is removed from the body 1 is placed on such a horizontal plane and coupled to the body 1 through a connector (not shown), it can be used independently.

Thus, since the image-reading unit 90 can be used in either state as attached to the body 1 or as removed from the body 1 for independent use according to the user's demand, there can be provided the multi-functional image-forming apparatus which can be readily operated by many users irrespective of service places and applications therefor.

As described above, in the image-forming apparatus according to the present invention, since an document-reading unit is mounted to an exterior cover (cover) through which at least part of the image-forming means can be removed from the interior of the apparatus, the exterior cover can be operated without being disturbed by the document-reading unit, thereby smoothly performing the attaching and detaching operations of at least part of the image-forming means.

Further, in the image-forming apparatus according to the present invention, a common delivery tray can be used for both the recording paper and the original document, which leads to achievement of space-saving therein and therefore enables the image-forming apparatus to be minimized. Further, since the recording paper and the original document is delivered to the tray with the image-printed or image-bearing surfaces thereof facing in different directions, the user can be prevented from confusing the recording paper with the original document.

It is to be noted that although the most preferred embodiments according to the invention is described, persons skilled in the art may consider other constitutions or modifications. Therefore, this invention is not restricted to the embodiments above, other variations are covered as far as within the scope of the following claims.

What is claimed is:

1. An image-forming apparatus, comprising:

a main assembly;

an image-forming means for forming an image on a recording medium, at least a part of said image-forming means being removably attached to an interior of said main assembly;

a cover for opening and closing said interior of the main assembly, wherein at least said a part of the image-forming means is removable from the interior of the main assembly when said cover is opened; and a document-reading unit for reading an original document, said document-reading unit being mounted to said cover so as to be moved together with the cover.

2. An image-forming apparatus as claimed in claim 1, wherein said document-reading unit is removably mounted to said cover.

3. An image-forming apparatus as claimed in claim 1, further comprising a delivery tray for receiving said recording medium on which the image has been formed by said image-forming means, said delivery tray being formed integrally with said cover.

4. An image-forming apparatus as claimed in claim 1, wherein said document-reading unit is mounted to a front surface of said image-forming apparatus.

5. An image-forming apparatus as claimed in claim 3, wherein said document-reading unit is mounted on a front side of said delivery tray.

6. An image-forming apparatus as claimed in claim 1, further comprising a first sheet-feeding tray for receiving said recording medium to be supplied to said image-forming means;

a delivery tray for receiving said recording medium on which the image has been formed by said image-forming means; and a second sheet-feeding tray for receiving said original document to be supplied to said document-reading unit, said recording medium and said original document being supported in said first and second sheet-feeding trays and said delivery tray in approximately upright state relative to a bottom surface of said image-forming apparatus.

7. An image-forming apparatus as claimed in claim 1, wherein said at least a part of said image-forming means is at least one element selected from an electrophotographic photosensitive member, a charging means for electrifying said electrophotographic photosensitive member, a developing means for supplying a developing material to said electrophotographic photosensitive member and a cleaning means for cleaning said electrophotographic photosensitive member.

8. An image-forming apparatus having a function for reading an original document, comprising:

an image-forming means for forming an image on a recording medium;

a document-reading means for reading the original document; and a common tray for receiving said recording medium on which the image has been formed by said image-forming means, and said original document from which the image has been read out by said document-reading means, said recording medium and said original document being received in said common tray in a manner that front and rear surfaces thereof facing in different directions from each other.

9. An image-forming apparatus as claimed in claim 8, further comprising a cover for opening and closing an interior of said image-forming apparatus in such a manner that when said cover is opened, at least a part of said image-forming means is removable from said interior of the image-forming apparatus, said document-reading means being mounted onto said cover so as to be moved together with the cover.

10. An image-forming apparatus as claimed in claim 9, wherein said common tray is formed integrally with a part of said cover.

* * * * *